United States Patent [19]

Yokogawa

[11] Patent Number: 4,974,081

[45] Date of Patent: Nov. 27, 1990

[54] CLOCK PULSE GENERATING CIRCUIT

[75] Inventor: Fumihiko Yokogawa, Saitama, Japan

[73] Assignee: Pioneer Electronic Corporation, Tokyo, Japan

[21] Appl. No.: 493,053

[22] Filed: Mar. 13, 1990

[51] Int. Cl.$^5$ .............................................. H04N 5/04
[52] U.S. Cl. .................................... 358/148; 358/149; 358/158
[58] Field of Search ...................... 358/148, 149, 158; 328/63, 72, 108, 109

[56] References Cited

U.S. PATENT DOCUMENTS

| 3,904,823 | 9/1975 | Van Straaten | 358/158 |
| 4,769,704 | 9/1988 | Hirai et al. | 358/158 |
| 4,847,678 | 7/1989 | McCauley | 358/149 |

Primary Examiner—John W. Shepperd
Assistant Examiner—Michael D. Parker
Attorney, Agent, or Firm—Sughrue, Mion, Zinn, Macpeak & Seas

[57] ABSTRACT

A clock pulse generating circuit is provided which is capable of generating a stabilized clock pulse without being effected by disturbance due to the vertical equalizer pulse. The clock pulse generating circuit includes a PLL circuit for generating a clock pulse which is phase-synchronized with an input signal. The circuit further includes a synchronizing circuit for generating a window pulse synchronized with the horizontal synchronizing signal by being operated with a clock pulse generated by the PLL circuit as a reference. The synchronization condition is judged with respect to the composite synchronizing signal and a gate circuit which permits passage of the composite synchronizing signal only during the period of existence of the window signal. Accordingly, the signal is constructed so as to select the composite synchronizing signal before passage through the gate in an asynchronous condition of the synchronizing circuit. Similarly, the composite synchronizing signal is passed after passage through the gate in a synchronous condition, the composite synchronizing signal being used as the input to the PLL circuit.

5 Claims, 2 Drawing Sheets

CLOCK PULSE GENERATING CIRCUIT

FIELD OF THE INVENTION

The present invention relates to a clock pulse generating circuit, and more particularly to a circuit which generates a clock pulse synchronized with a horizontal signal contained in a composite synchronizing signal.

BACKGROUND OF THE INVENTION

In order to digitally process a video signal (hereinafter referred to as video format signal) obtained by reading and demodulating a signal from a recording medium such as a video disk or a video tape, it is necessary to have a high frequency clock pulse which is synchronized with the video format signal. For this reason, a clock pulse generating circuit is constructed to phase lock a phase locked loop (PLL) circuit with the horizontal synchronizing signal in the format signal for clock pulse generation. In a clock pulse generating circuit as mentioned above, handling disturbance generated by the vertical equalizing pulse in the composite synchronizing signal becomes a concern.

In an effort to prohibit disturbances due to the vertical equalizing pulse, various circuit constructions have been tried in the past. For example, in one circuit the vertical equalizing pulse is deleted from the composite synchronizing signal through analog processing, leaving only the horizontal synchronizing signal, then, the resultant signal is input into the PLL circuit. Japanese Patent Unexamined Publication No. Sho. 63-234673 discloses to keep the PLL circuit in an open state during the vertical flyback period to stop the operation of the phase comparator within the PLL circuit.

However, in the former case where the deletion of the vertical equalizing pulse is performed by analog processing, the number of components becomes large and adjustment of the time constant becomes necessary. Also, stopping the operation of the phase comparator in the PLL circuit results in a deviation of the generated clock pulses over that period.

SUMMARY OF THE INVENTION

The present invention was motivated in view of the above. Therefore, the object of the present invention is to provide a clock pulse generating circuit which can eliminate additional components such as capacitors and resistors, and thereby also eliminate their adjustment. Further, an object of the present invention is to provide a clock pulse generating circuit which is capable of generating a stabilized clock pulse without being affected by disturbances generated by the vertical equalizing pulse.

The clock pulse generating circuit of the present invention includes a PLL circuit for generating a clock pulse which is phase-synchronized with an input signal, and a synchronizing circuit for generating a window pulse synchronized with the horizontal synchronizing signal by being operated with a clock pulse generated by the PLL circuit as the reference. The synchronization condition is judged with respect to the composite synchronizing signal and a gate circuit which permits the passage of the composite synchronizing signal only during the period of existence of the window signal. The circuit is constructed to select the composite synchronizing signal before passage through the gate when the synchronizing circuit is in the asynchronous condition, and to select the composite synchronizing signal after passage through the gate when the synchronizing circuit is in a synchronous condition, the composite synchronizing signal being used as the input to the PLL circuit.

DETAILED DESCRIPTION OF THE PREFERRED EMBODIMENT

Figure 1:
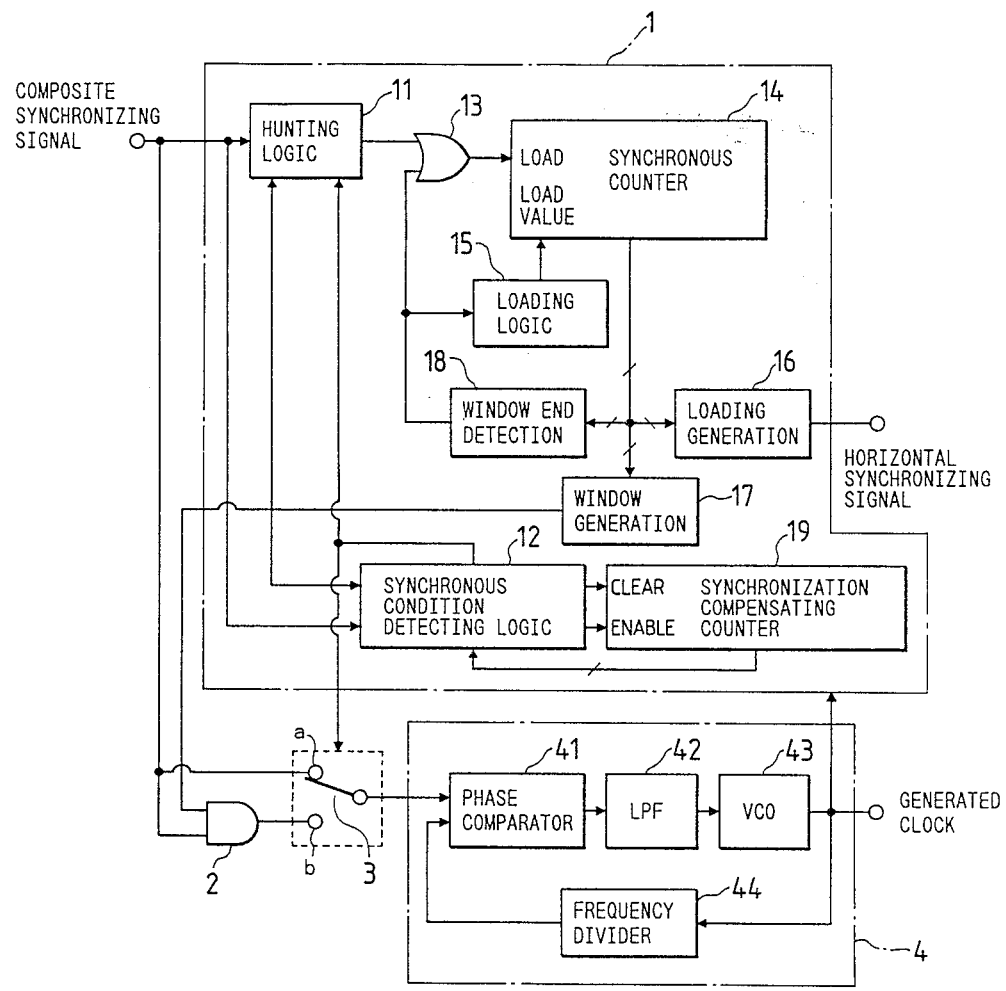
FIG. 1 is a block diagram showing an embodiment of the present invention.

Referring to the drawings, an embodiment of the present invention is described in detail as follows.

In FIG. 1, which shows an embodiment of the present invention, a composite synchronizing signal is extracted by a synchronization extraction circuit (not shown) from a reproduced video format signal obtained by reading and demodulating a signal from a recording medium such as a video disk or a video tape. The reproduced composite synchronizing signal is supplied to a horizontal synchronization compensating circuit 1 operating as a synchronizing circuit. The horizontal synchronization compensating circuit 1 is operated with a clock pulse generated in the PLL circuit 4 (to be described later) acting as a system clock. The input composite synchronizing signal is supplied respectively to a hunting logic circuit 11 and a synchronous condition detecting logic circuit 12 contained in horizontal synchronization compensating circuit 1. The hunting logic circuit 11 determines whether the system is in a hunting mode or in a non-hunting mode. Where, the hunting mode means a condition that the system is asynchronized and is searching the input of the synchronizing signal, and the non-hunting mode means the other conditions. In the non-hunting mode, the synchronizing signal is supplied to the system. When a composite synchronizing signal is input to the hunting logic circuit 11 in the hunting mode, the composite synchronizing signal becomes a load input to a synchronous counter 14 through the hunting logic circuit 11 and an OR gate circuit 13. With the input of the load, a load value set in a loading logic circuit 15 is loaded into the synchronous counter 14, and the synchronous counter 14 simultaneously starts the counting operation with the cycle of the system clock.

Based on the counted value of the synchronous counter 14, a synchronizing signal is generated in a timing generating circuit 16, and window pulses having a predetermined width are generated in a window generating circuit 17 in the range of one horizontal scanning interval ±α clocks. Further, a window end, namely, a fall of a window pulse, is detected by a window end detecting circuit 18. The detected output of the window end detecting circuit 18 is used as a load input to the synchronous counter 14 through the OR gate circuit 13, and also serves as a trigger input to the loading logic circuit 15. The loading logic circuit 15 determines a load value in response to the detection output of the window end detecting circuit 18.

The synchronous condition detecting logic circuit 12 is for discriminating whether the system is in a synchronous condition based on the counted value of the synchronization compensating counter 19. When a composite synchronizing signal is input under an asynchronous condition during the period of the window pulse which is output from the window generating circuit 17, the synchronous condition detecting logic circuit 12 sets the synchronization compensating counter 19 to be count enabled so that the counting of the composite synchronizing signal is started. When, the counted value N reaches a predetermined value ("9," for example), in other words, when a phenomenon as each composite synchronizing signal appearing during each period of the window pulse appears for equal to or than 9 times consecutively, the synchronous condition detecting logic circuit 12 sets the synchronization flag to "H" level, that is, to the synchronous condition.

Subsequently, in the synchronous condition, if a composite synchronizing signal is input during the period of next window pulse by which the counted value is set to N=0, the logic circuit 12 clears the synchronization compensating counter 19. Further, in the synchronous condition, if a composite synchronizing signal is not input during the period of a window pulse, the logic circuit 12 brings the synchronization compensating counter 19 to a count enabled condition. When the counted value N reaches a predetermined value ("4," for example), the logic circuit 12 judges the condition to be asynchronous and brings the synchronization flag to "L" level.

The composite synchronizing signal is supplied to a two-input AND gate circuit 2 and a selection switch 3, respectively. The window pulse generated in the window generating circuit 17 is supplied to the other input of the AND gate circuit 2, The composite synchronizing signal passes through only during the period of the window pulse. The composite synchronizing signal passes through the AND gate circuit 2 is supplied to the input to the selection switch 3. The selection switch 3 is normally located on the side of contact a, and when an "H" level synchronization flag (signal indicating a synchronous condition) is supplied from the synchronous condition detecting circuit 12, it is changed over to the side of fixed contact b. In other words, the selection switch 3 selects the composite synchronizing signal before passage through the gate circuit 2 when the horizontal synchronization compensating circuit 1 is in an asynchronous condition, and selects a composite synchronizing signal after passage through the gate circuit 2 when the circuit 1 is in a synchronous condition.

Figure 2:
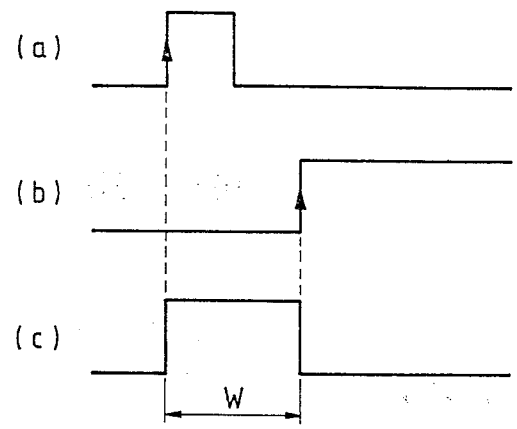
FIG. 2 is a waveform diagram for explaining the circuit operation of the phase compensator in FIG. 1.

The composite synchronizing signal selected by the selection switch 3 is supplied to a phase comparator 41 of the PLL circuit 4. The phase comparator 41 may be, for example, an edge comparison type phase comparator. In the phase comparator 41, the phase difference is detected between the edge (a) of the input composite synchronizing signal and the edge (b) of the frequency divided clock of the horizontal scanning frequency (15,734 kHz) obtained by dividing the oscillation clock of a voltage controlled oscillator (VCO) 43 with a frequency divider 44, as shown in FIG. 2. A comparison output (c) having pulse width W corresponding to the phase difference is derived. The comparison output serves as a control voltage for the VCO 43 via a low pass filter (LPF) 42. The oscillation clock of the VCO 43 is supplied to the horizontal synchronization compensating circuit 1 as its system clock. This clock is used in various circuits of the system 1, including the counters 14 and 19.

As described in the above, by a combined operation of the horizontal synchronization compensating circuit 1 and the PLL circuit 4, only those composite synchronizing signals with proper timing, whcih composit synchronizing signal is input during the window pulse, are input to the PLL circuit 4 in the synchronous condition. Therefore, the circuit operation of the PLL circuit becomes stabilized, and the present generating circuit can follow a video format signal with time base variations, such as one obtained by playing a recording medium like a video disk or a video tape.

Figure 3:
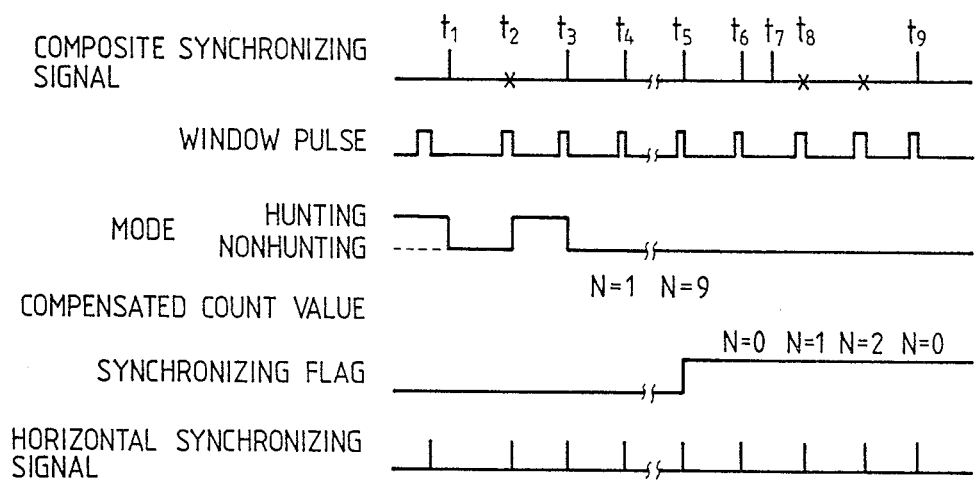
FIG. 3 is a timing chart for explaining the circuit operation of the horizontal synchronization compensating circuit in FIG. 1.

Next, referring to a time chart in FIG. 3, the circuit operation of the horizontal synchronization compensating circuit 1 will be described.

First, in a state in which the synchronization flag is at "L" level, that is, in an asynchronous condition and no composite synchronizing signal is input, the hunting logic circuit 11 is in the hunting mode. When a composite synchronizing signal is input in the hunting mode (at time $t_1$), the circuit 11 goes to the nonhunting mode. At this time, the input composite synchronizing signal becomes a load input to the synchronous counter 14 via the hunting logic circuit 11 and the OR gate circuit 13. With this operation, the synchronous counter 14 starts incrementing the load value as soon as a load value set in the loading logic circuit 15 is loaded. When the counted value reaches a target value, a window pulse is generated in the window generating circuit 17 (at time $t_2$). At this time, window pulses are generated in the range of one horizontal scanning interval $\pm \alpha$ clocks.

If no composite synchronizing signal is input during the period of the window pulses, the hunting logic circuit 11 goes back to the hunting mode again and waits for the input of the next composite synchronizing signal. With input of the next composite synchronizing signal (at time $t_3$), the hunting logic circuit 11 goes to the nonhunting mode again. If a composite synchronizing signal is input (at time $t_4$) during the period of the window pulse in this nonhunting mode, the synchronous condition detecting logic circuit 12 sets the synchronization compensating counter 19 to the count enable condition. With this operation, the counted value of the synchronization compensating counter 19 is incremented by "1". The counting of the composite synchronizing signal is started. When the counted value N becomes equal to or greater than "9", for example, (at time $t_5$), in other words, when the phenomenon as each composite synchronizing signal appearing during each period of the window pulse appears for equal to or more than 9 times consecutively, the synchronous condition detecting circuit 12 detects such, sets the synchronization flag to "H" level, and judges the state to be in the synchronous condition.

Subsequently, when a composite synchronizing signal is input (at time $t_6$) during the period of the next window pulse after judgement of the synchronous condition, the synchronous condition detecting logic circuit 12 clears the synchronization compensating counter 19 by which the counted value is set to N=0. In this state, even if an erroneously detected composite synchronizing signal is input in the absence of a window pulse (at time $t_7$), the passing of the composite synchronizing signal is obstructed by the hunting logic circuit 11 since it is outside of the window pulse, and the synchronous counter 14 will never be loaded.

On the other hand, if a composite synchronizing signal to be input during the period of the window pulse is missing (at time $t_8$), the counted value will be loaded into the synchronous counter 14 by outputting the signal of the window end detection circuit 18, so that the synchronization signals will be generated consecutively with a synchronizing interval. Here, a corrected load value corrected by a loading logic circuit 15 is loaded into the synchronous counter 14 so that the pulse width of the window pulse is corrected.

Further, when no composite synchronizing signal is input during the period of the window pulse, the synchronization compensating counter 19 goes to count enable, with the counted value incremented by "1". For example, if the condition four consecutive times, the synchronous condition detecting logic circuit 12 judges the state to be asynchronous, and sets the synchronization flag to "L" level. If a composite synchronizing signal is input during the period of the window pulse prior to four consecutive times of no composite synchronizing signal being input during the window pulse (at time $t_9$), the synchronous condition detecting-logic circuit 12 clears the synchronization compensating counter 19, and brings the counted value N to zero.

With the operation as described above, if the composite synchronizing signals are input consecutively with the correct intervals, it is judged that the state is in synchronous condition, and unless the composite synchronizing signals are missed several times thereafter, the system excludes composite synchronizing signals with incorrect intervals, and can generate horizontal synchronizing signals with correct intervals by providing compensation for the missing horizontal synchronizing signals.

As described in the foregoing, in the clock pulse generating circuit in accordance with the present invention, the circuit generates a window pulse at the cycle of the horizontal synchronizing signal by using the generating clock pulse as the reference. In addition, the clock pulse generating circuit is constructed so as to let the composite synchronizing signal pass only during the period of the window pulse, and to let the composite synchronizing signal pass without going through the gate for the asynchronous condition In addition, the composite synchronizing signals allowed to pass after passing through the gate for the synchronous condition are supplied to the PLL circuit. Accordingly, stabilized clocks can be generated without requiring components such as capacitors and resistors, and their adjustment. Moreover, stabilized clocks can be generated without being affected by disturbance due to the vertical equalizing pulses.

I claim:

1. A clock pulse generating circuit which generates a clock pulse synchronized with a horizontal synchronizing signal in a composite synchronizing signal comprising:
    a phase locked loop circuit which generates a clock pulse phase-synchronized with an input signal;
    a synchronizing circuit which generates window pulses at a cycle of said horizontal synchronizing signal by being operated with said clock pulse generated by said PLL circuit as the reference, and which judges a condition of synchronization with said composite synchronizing signal;
    a gate circuit which permits said composite synchronizing signal to pass to said phase locked loop circuit only during the period when said window pulses exist; and
    means for selecting said composite synchronizing signal before passage through said gate circuit when said synchronizing circuit is in an asynchronous condition, and for selecting the composite synchronizing signal after passage through said gate circuit when in a synchronous condition.

2. A clock pulse generating circuit as claimed in claim 1, wherein said synchronizing circuit judges that it is in a synchronous condition when more than a predetermined number of pulse edges of said composite synchronizing signal are consecutively input during periods of said window pulses.

3. A clock pulse generating circuit as claimed in claim 1, wherein said synchronizing circuit judges that it is in an asynchronous condition when no pulse edges of said composite synchronizing signal are consecutively input during periods of said window pulses for a predetermined number of times.

4. A clock pulse generating circuit as claimed in claim 1, wherein said phase locked loop circuit comprises:
    a phase comparator connected to said gate circuit for detecting a phase difference and for generating an output with a pulse width corresponding to said phase difference;
    a low pass filter connected to said output of said phase comparator;
    a voltage controlled oscillator connected to an output of said low pass filter, wherein an output of said voltage controlled oscillator is supplied to said synchronizing circuit for use as a system clock; and
    a frequency divider connected between said voltage controlled oscillator and said phase comparator.

5. A clock pulse generating circuit as claimed in claim 1, wherein said gate circuit is an AND gate.

* * * * *